(12) United States Patent
Trischler et al.

(10) Patent No.: US 12,067,490 B2
(45) Date of Patent: *Aug. 20, 2024

(54) PARALLEL-HIERARCHICAL MODEL FOR MACHINE COMPREHENSION ON SMALL DATA

(71) Applicant: Microsoft Technology Licensing, LLC, Redmond, WA (US)

(72) Inventors: Adam Trischler, Montreal (CA); Zheng Ye, Wuhan (CN); Xingdi Yuan, Montreal (CA); Philip Bachman, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,155

(22) Filed: Oct. 17, 2022

(65) Prior Publication Data

US 2023/0042546 A1 Feb. 9, 2023

Related U.S. Application Data

(63) Continuation of application No. 16/872,500, filed on May 12, 2020, now Pat. No. 11,507,834, which is a continuation of application No. 15/461,250, filed on Mar. 16, 2017, now Pat. No. 10,691,999.

(60) Provisional application No. 62/309,139, filed on Mar. 16, 2016.

(51) Int. Cl.
| | | |
|---|---|---|
| *G06N 3/08* | (2023.01) | |
| *G06F 40/284* | (2020.01) | |
| *G06F 40/30* | (2020.01) | |
| *G06N 3/045* | (2023.01) | |
| *G06N 5/022* | (2023.01) | |
| *G06N 5/04* | (2023.01) | |
| *G06N 20/10* | (2019.01) | |

(52) U.S. Cl.
CPC ............ *G06N 3/08* (2013.01); *G06F 40/284* (2020.01); *G06F 40/30* (2020.01); *G06N 3/045* (2023.01); *G06N 5/022* (2013.01); *G06N 5/04* (2013.01); *G06N 20/10* (2019.01)

(58) Field of Classification Search
CPC ....... G06N 3/08; G06N 5/022; G06F 17/2785
See application file for complete search history.

(56) References Cited

U.S. PATENT DOCUMENTS 10,691,999 B2 * 6/2020 Trischler ............... G06F 40/284
11,507,834 B2 * 11/2022 Trischler ............... G06N 5/022
(Continued)

OTHER PUBLICATIONS

Yin et al, "Attention-Based Convolutional Neural Network for Machine Comprehension", 2016, arXiv, all pages (Year: 2016).*

*Primary Examiner* — Daniel C Puentes (57) ABSTRACT

Examples of the present disclosure provide systems and methods relating to a machine comprehension test with a learning-based approach, harnessing neural networks arranged in a parallel hierarchy. This parallel hierarchy enables the model to compare the passage, question, and answer from a variety of perspectives, as opposed to using a manually designed set of features. Perspectives may range from the word level to sentence fragments to sequences of sentences, and networks operate on word-embedding representations of text. A training methodology for small data is also provided.

20 Claims, 7 Drawing Sheets (56) References Cited

U.S. PATENT DOCUMENTS

2016/0378851 A1* 12/2016 Merdivan ........... G06F 16/9024
707/728
2017/0124475 A1* 5/2017 Anderson .............. G06N 5/045

* cited by examiner

PARALLEL-HIERARCHICAL MODEL FOR MACHINE COMPREHENSION ON SMALL DATA

CROSS-REFERENCE TO RELATED APPLICATIONS

This application is a continuation application of U.S. patent application Ser. No. 16/872,500, filed on May 12, 2020, which is a continuation application of U.S. patent application Ser. No. 15/461,250, filed on Mar. 16, 2017, now U.S. Pat. No. 10,691,999, which claims the benefit of, and priority to, U.S. Provisional Application No. 62/309,139, entitled, "Parallel-Hierarchical Model for Machine Comprehension on Small Data," filed on Mar. 16, 2016, the entire disclosures of all are hereby incorporated herein by reference.

FIELD

The present specification relates processing comprehension of text.

BACKGROUND

Understanding unstructured text is a major goal within natural language processing. machine comprehension tests (e.g., MCTest) pose questions based on short text passages to evaluate such understanding. Comprehension systems aim to extract the correct answer from the passage which contains it. Partly because of its limited size, prior work on MCTest has focused mainly on feature-based approaches.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

A machine comprehension system with a learning-based approach, harnessing neural networks arranged in a parallel hierarchy is provided. This parallel hierarchy enables the model to compare the passage, question, and answer from a variety of perspectives, as opposed to using a manually designed set of features. Perspectives may range from the word level to sentence fragments to sequences of sentences, and networks operate on word-embedding representations of text. A training methodology for small data is also provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION OF THE EMBODIMENTS

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Humans learn in a variety of ways. For instance, humans learn by communication with each other, and by study—the reading of text. Comprehension of unstructured text by machines, at a near-human level, is one goal within natural language processing. It has garnered significant attention from the machine learning research community in recent years, giving rise to a host of models and datasets on which to test them.

Typically, machine comprehension (MC) is evaluated by posing a set of reading questions based on a text passage. This is akin to the reading tests we all took in school. Such tests are objectively gradable, and can be used to assess a range of abilities from basic understanding to causal reasoning to inference. Given a text passage and a question about its content, a machine is tested on its ability to determine the correct answer to the question. MCTest is a small but complex benchmark that requires not only extraction but also inference and limited reasoning.

Aspects of the present disclosure generally relate to a parallel-hierarchical approach to machine comprehension process that is geared towards small data. For example, MCTest, comprising only 660 passages with related questions and multiple-choice answer candidates, is an example of such a data set. For ease of disclosure, the various aspects described herein may be described with respect to processing data related to MCTest. One of skill in the art will appreciate that the various aspects disclosed herein, however, may be performed using other types of input. For example, various types of documents, communications using natural language expressions, books, web pages, log files, or any type of electronic document may be processed using the various aspects disclosed herein.

In various aspects, the model compares question and answer to text using several distinct perspectives. As used herein, a question combined with one of its answer candidates is referred to as a hypothesis, which will be described in further detailed below. One exemplary perspective, the semantic perspective, compares the hypothesis to sentences in the text viewed as single, self-contained thoughts which may be represented using a sum and transformation of word embedding vectors. Another exemplary perspective, the word-by-word perspective, focuses on similarity matches between individual words from hypothesis and text, at various scales. As in the case with the semantic perspective, there may be a sentential scale. In another aspect, a sliding Gaussian window acting on a subsentential scale, which implicitly considers the linear distance between matched words, may also be used. Such a word-level sliding window operates on two different views of text sentences such as the sequential view, where words appear in their natural order, and the dependency view, where words may be reordered based on a linearization of the sentence's dependency graph. These distinct perspectives naturally form a hierarchy of processing, which will be described in further detail with respect to FIG. 2. In various aspects, words may be represented within the model by embedding vectors.

With the exception of the dependency-graph linearization (which relies on an eigendecomposition), the end-to-end comparison function that implements and synthesizes these perspectives may be a differentiable neural model, trainable by backpropagation. Specific feature engineering is not performed (although the dependency graph can be considered an additional feature), and the model takes as input only word embeddings. This is in contrast to most previous efforts on MCTest that use numerous features. In experiments, the model achieves state-of-the-art accuracy on MCTest, outperforming all known alternatives on the test set.

To facilitate learning on small data, a training scheme may be provided. The model's neural networks may be initialized to perform specific heuristic functions. These were functions may be used in order to yield satisfactory performance on the dataset. In doing so, the training approach gives the model a safe, reasonable baseline from which to start learning.

It is to be appreciated by a person of skill in the art with the benefit of this description that machine comprehension requires machines to answer questions based on unstructured text. This can be viewed as selecting the best answer from a set of candidates. In the multiple-choice case, candidate answers are predefined by the test designer, but candidate answers may also be undefined yet restricted (e.g., to yes, no, or any noun phrase in the text).

For each question q, let T be the unstructured text and $A=\{a_1; \ldots, a_m\}$ be the set of candidate answers to q. The machine comprehension task reduces to selecting the answer $\hat{a}_i$ that has the highest evidence given T. An answer and a question are combined into a hypothesis, $h_i = f(q; a_i)$. To facilitate comparisons of the text with the hypotheses, the passage is broken down into sentences $t_j$, $T=\{t_j\}$. In this setting, q, $a_i$, and $t_j$ each represent a sequence of embedding vectors, one for each word and punctuation mark in the respective item.

In addition, is to be appreciated by a person of skill in the art with the benefit of this description that models may be divided into a number of different approaches, such as a feature-based approach and a learning-based approach. The feature-based approach relies on manually engineered features of the data that require significant effort on the part of a human designer, and/or significant auxiliary tools to extract these features for use. The learning-based approach typically harnesses a single feature such as, for example, vector-representations of words, or word embeddings. These may be pretrained and fine-tuned, or trained entirely on the dataset. Typically, word embeddings may be input into a deep neural network which processes and compares text to questions and answers. Among deep-learning models, mechanisms of attention and working memory may be used.

Feature-Based Models

MCTest can be treated as a structured prediction problem, searching for a latent answer entailing structure connecting question, answer, and text. This structure corresponds to the best latent alignment of a hypothesis with appropriate snippets of the text. The process of (latently) selecting text snippets may be related to the attention mechanisms typically used in the deep statistical learning models for machine comprehension and machine translation. The model uses event and entity co-reference links across sentences along with a host of other features. These features may include specifically trained word vectors for synonymy; antonymy and class-inclusion relations from external database sources and/or dependencies and semantic role labels. The model may be trained using a latent structural support vector machine (SVM) extended to a multitask setting, so that questions are first classified using a pretrained top-level classifier. This enables the system to use different processing strategies for different question categories. The model also combines question and answer into a well formed statement using rules.

In some embodiments, the model can be simplified in terms of the features it has access to, the training procedure (e.g., stochastic gradient descent, alternate minimization, etc.), question classification, and question-answer combination (e.g., concatenation, mean, a set of rules etc.).

It is to be appreciated that the baseline feature set may be combined with feature modules for a co-reference resolution, stemming, and rules for question classification. The simple model improved on the original baseline, but does not approach state-of-the-art results.

The baseline feature may also be augmented with features for syntax, frame semantics, coreference, and/or word embeddings. The frame semantic features in particular may require significant manual effort. Features may be combined using a linear latent-variable classifier trained to minimize a max-margin loss function. Questions and answers may be combined using a set of rules.

Learning-Based Models

While the learning-based approach may be used, this approach is generally less accurate than the feature-based model described above on MCTest. This is because the dataset is small and complex. A neural network that captures complex patterns typically requires many parameters, and the more parameters, the more training data is required to tune them all. Deep models develop their own features, rather than being provided them by a designer, but this is a data-intensive process.

Deep learning approaches on MCTest have also been carried out. They measured the performance of the Attentive Reader and the Neural Reasoner, both recurrent models with attention mechanisms, and also developed an attention-based convolutional network, the HABCNN. Their network operates on a hierarchy, providing further evidence of the promise of hierarchical perspectives. Specifically, the HABCNN processes text at the sentence level and the snippet level, where the latter combines adjacent sentences like the n-gram input. Embedding vectors for the question and the answer candidates are combined and encoded via convolutional network. This encoding modulates attention over sentence and snippet encodings, followed by maxpooling to determine the best matches between question, answer, and text.

Parallel-Hierarchical Model

Figure 1:
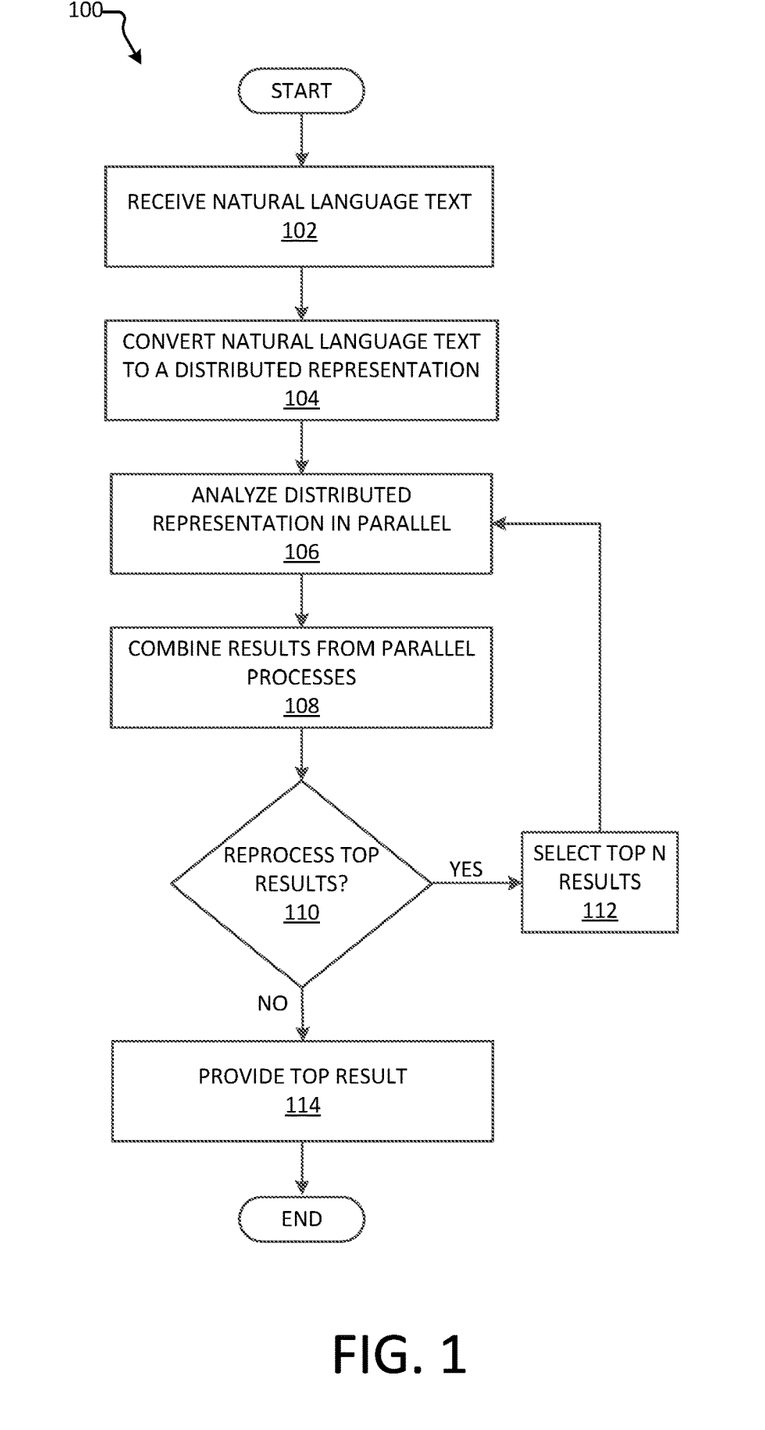
FIG. 1 illustrates an overview of an example method for performing parallel-hierarchical machine comprehension on a data set.

FIG. 1 illustrates an overview of an example method 100 for performing parallel-hierarchical machine comprehension on a data set. Flow begins at operation 102 where a data set is received. In one aspect, the received data set may include natural language text. In one example, the received data set includes one or more questions, one or more answers, and one or more textual entries which may be analyzed to select the appropriate answer to a question. Flow continues to operation 104 where the received text is converted to a distributed representation. In one example, converting the text to a distributed representation may comprise determining a vector representation for each word and/or group of words in the received data set. In one aspect, a neural network may be employed convert the text to a distributed representation. One such neural network may be a multilayer perceptron (MLP). One of skill in the art, however, will appreciate that other types of neural networks may be used without departing from the spirit of this disclosure.

Flow continues to operation 106 where the distributed representation of the received text may be analyzed in parallel in order to determine the correct answer to the one or more questions. In examples, various different processes may be employed to analyze the distributed text at operation 106 including, but not limited to, a semantic perspective process, a word-by-word perspective process, a sequential perspective process, a sliding window processes, and the like. While specific examples different types of processes performed in parallel have been described herein, on of skill in the art will appreciate that other types of processes may be employed without departing from the scope of this disclosure.

Flow continues to operation 108 where the output form the different processes may be combined into a single result set. In one example, the combination of the results may be performed by a neural network. For example, the outputs from the different processes may be provided to an MLP. In addition to combining the results, the neural network may be further operable to order the hypotheses by likelihood of correctness based upon the combined results of the various processors employed at operation 108.

In some aspects, the results may be further refined. For example, further processing may be performed on ordered hypotheses generated by combining the results at operation 108. If refinement is to be performed, flow branches YES from decision operation 110 to operation 112. At operation 112, a predetermined number of the top results may be selected for further processing. The number of results selected may be determined in advanced by the process performing the method 100 or may be determined dynamically based upon the combined results generated at operation 108. Flow may then return to operation 106 where a number of top results may be provided as input to the processes executing in parallel at operation 106.

Returning to operation 110, in alternate aspects, the refinement processing may not be performed or may not be necessary. In such aspects, flow branches NO to operation 114 where a top result may be provide. In certain aspects, more than one top rated result mays be returned to operation 114.

Figure 2:
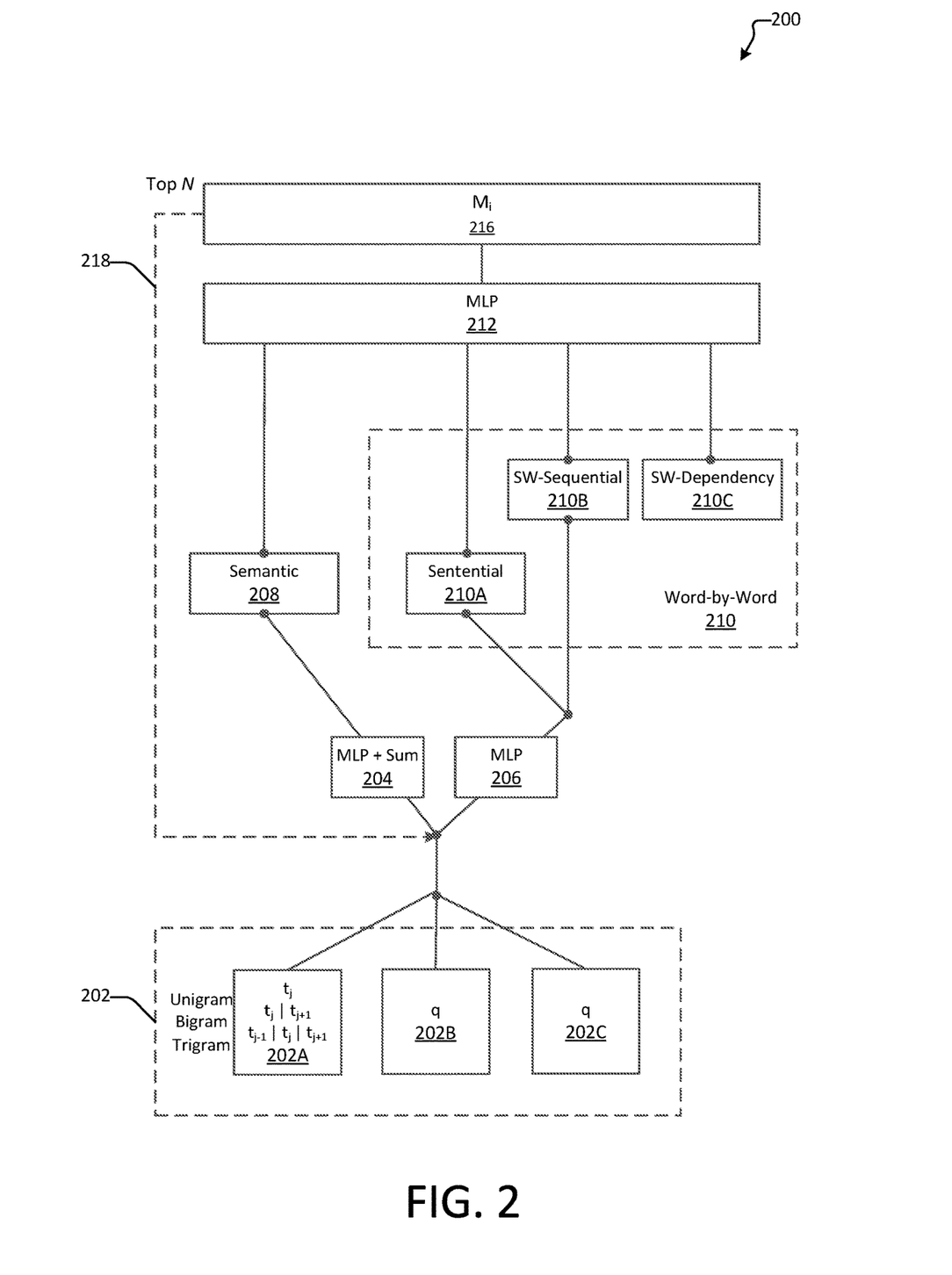
FIG. 2 illustrates an example process for performing parallel-hierarchical machine comprehension on a data set using semantic and word-by-word processes in parallel.

FIG. 2 illustrates an example process for performing parallel-hierarchical machine comprehension on a data set using semantic and word-by-word processes in parallel. In this model, each of the perspectives (semantic perspective and word-by-word perspective) are discussed separately, then describe how they are combined. The different perspectives use word embedding vectors as input. Below, subscripts are used to index elements of sequences, like word vectors, and superscripts to indicate whether elements come from the input data 202 which may include text data 202A, question data 202B, and/or answer data 202B. In particular, subscripts (k; m; n; p) are used to index sequences of words from the text, question, answer, and hypothesis, respectively. In one example, the text data may be parsed by individual words, as a unigram (e.g., a single sentence), a bigram (e.g., two sentences), a trigram (e.g., three sentences) or any number of combined sentences.

In the semantic perspective process 208, each sentence of the text may be a sequence of d-dimensional word vectors: $t_j=\{x_k^t\}$, $x_k^t \in \mathbb{R}^d$. The semantic vector $s_t$ may be computed using a MLP plus sum process 204. For example, the semantic vector $s^t$ may be computed by embedding the word vectors into a D-dimensional space using a multilayer perceptron (MLP) whose inner transformation is augmented with a sum; i.e., $$s^t = f\left(A^t \sum_k \omega_k x_k^t + b_A^t\right). \qquad (1)$$

The matrix $A^t \in \mathbb{R}^{D \times d}$ the bias vector $b_A^t \in \mathbb{R}^D$, and in certain aspects, for $f$ the leaky ReLU function may be used. The scalar $\omega_k$ may be a trainable weight associated to each word in the vocabulary. These scalar weights form an exogenous or bottom-up attention that depends only on the input stimulus. They scaler weights may, for example, learn to perform the function of stopword lists in a soft, trainable way, to nullify the contribution of unimportant filler words.

The semantic representation of a hypothesis may be formed analogously, except that the question word vectors $x^q_m$ and answer word vectors $x^a_n$ are combined as a single sequence $\{x_p^r\}=\{x_m^q, x_n^a\}$. For semantic vector $s_h$ of the hypothesis, a unique transformation matrix $A' \in \mathbb{R}^{D \times d}$ and bias vector $b_A' \in \mathbb{R}^D$ may be used.

These transformations map a text sentence and a hypothesis into a common space where they can be compared. The semantic match between text sentence and hypothesis may be computed using the cosine similarity, $$M^{sem}=\cos(s^t,s^h). \qquad (2)$$

The first step in building the word-by-word perspective 210 is to transform word vectors from a text sentence 202A, question 202B, and answer 202C through one or more respective MLPs 206. That is, $w^y=f(B^y b^y+b_B^y)$ where $B^y \in \mathbb{R}^{D \times d}$, $b_B^y \in \mathbb{R}^D$, and $y \in \{t,q,a\}$. In contrast with the semantic perspective 208, the question and answer candidates are kept separate in the word-by-word perspective 210. This is because matches to answer words are inherently more important than matches to question words, and the model learns and utilizes this. Various different word-by-word perspective processes may be employed to evaluate hypotheses, such as a sentential process 210A, a sliding window (SW) sequential process 210B, and/or a SW-dependency process 210C.

In the present aspect, matches between hypotheses and text sentences at the word level are computed using the sentential process 210A. This computation may be split over questions and answers, and as before uses the cosine similarity:

$$c_{km}^q = \cos(w_k^t, w_m^q), \quad (3)$$

$$c_{kn}^a = \cos(w_k^t, w_m^a). \quad (4)$$

The word-by-word match between a text sentence and question may be determined by taking the maximum over k (finding the text word that matches each question word) and then taking a weighted mean over m (finding the average match over the full question):

$$M^q = \frac{1}{Z}\sum_m \omega_m \max_k c_{km}^q. \quad (5)$$

Here, $\omega_m$ is the word weight and Z normalizes the weights to sum to unity over the question. The match between a sentence and answer candidate, $M^a$, is defined analogously. Finally, the matches are combined to question and answer according to $$M^{word} = \alpha_1 M^q + \alpha_2 M^a + \alpha_3 M^q M^a. \quad (6)$$

Here, the $\alpha$ are trainable parameters that control the relative importance of the different components.

The sequential sliding window process 210B hearkens back to the original MCTest baseline, with two key differences. First, a soft match between word vectors may be used rather than an exact lexical match of words; second, the sliding window decays from its focus word according to a Gaussian distribution, which may be manifest as weight for each position. This latter modification enables the window to use information about the distance between word matches; the original baseline made use of distance information through a predefined function.

The sliding window scans over the words of the text as one continuous sequence, without sentence breaks. Each window is treated like a sentence in the previous subsection, but a location based weight $\gamma_r$ is included, where r indexes the position in the window. The cosine similarity is adapted as $$c_{km,r}^y = \gamma_r \cos(w_k^t, w_m^y), y \in \{q, a\}. \quad (7)$$

The location weights, initialized with a Gaussian, can be fine-tuned in training. The final matching score, denoted as $M^{sws}$, is computed as in (5) and (6).

The dependency sliding window process 210B operates identically to the linear sliding window, but on a different view of the text passage. The passage may be divided into sentences. Then a dependency parser may be applied to each text sentence to build a dependency graph. One example of a dependency parser that may be employed is the Stanford Dependency Parser, however other dependency parsers may be sued without departing from the spirit of this disclosure. This graph has $n_w$ vertices, one for each word in the sentence. From the dependency graph the Laplacian matrix $L \in \mathbb{R}^{n_w \times n_w}$ is formed and determine its eigenvectors.

The second eigenvector $u_2$ of the Laplacian is known as the Fiedler vector. It is the solution to the minimization $$\min_g \sum_{i,j=1}^N \eta_{ij}(g(v_i) - g(v_j))^2, \quad (8)$$

where $v_i$ are the vertices of the graph, and $n_{ij}$ is the weight of the edge from vertex i to vertex j. Thus, the Fiedler vector maps a weighted graph onto a line such that connected nodes stay close, modulated by the connection weights. This enables the reordering of the words of a sentence based on their proximity in the dependency graph. The reordering of the words is given by the ordered index set $$I = \arg \text{sort}(u_2). \quad (9)$$

To give an example of how this works, consider the following sentence from MCTest and its dependency-based reordering: the sentence "Jenny, Mrs. Mustard's helper, called the police." May be reordered as "the police, called Jenny helper, Mrs. 's Mustard."

Sliding-window-based matching on the original sentence will answer the question "Who called the police?" with "Mrs. Mustard." The dependency reordering enables the model to determine the correct answer.

The dependency sliding window process 210C may uses an auxiliary tool, such as the Stanford Dependency Parser. These are rearranged based on the linearized dependency graph. The output of the dependency sliding window component is $M_{swd}$ and is formed analogously to $M_{sws}$.

Some data sets, such as the MCTest, may include questions where the evidence for an answer spans several sentences. The motivation here was to ensure the task could not be solved by lexical techniques alone, but would instead require some form of inference or limited reasoning. In order to deal with such examples, the model also takes in n-grams of sentences, i.e., sentence pairs and triples strung together. The model treats these exactly as it does single sentences, applying all functions detailed above. A later pooling operation combines scores across all n-grams (including the single-sentence input).

With n-grams, the model can synthesize information distributed across contiguous sentences. In some cases, however, the required evidence is spread across distant sentences. To give the model some capacity to deal with this scenario, the top N sentences as scored by all the preceding functions is used, and then repeat the scoring computations viewing these top N as a single sentence.

Another neural network 212, such as an MLP, is used to combine $M^{sem}$, $M^{word}$, $M^{swd}$, and $M^{sws}$ as a final matching score $M_i$ 216 for each answer candidate. This neural network also pools and combines the separate n-gram scores, and has a linear activation function.

Before training, the neural-network components of the model are initialized to perform sensible heuristic functions using a training wheel approach. It was found empirically that above 50% accuracy can be achieved on MCTest using a simple sum of word vectors followed by a dot product between the question sum and the hypothesis sum. Therefore, the MLP for the semantic perspective is initialized to perform a sum of word vectors. This is done by initializing $A^y$ as the identity matrix and $b^y_A$ as the zero vector, $y \in \{t, h\}$. Recall that the activation function is a ReLU so that positive outputs are unchanged.

The word-by-word MLPs were initialized with identity matrices and 0-biases as well, while the MLP for perspective combination was initialized to perform a sum of individual scores, using a zero bias-vector and a weight matrix of ones. Training It is to be appreciated that determining correct answers is challenging if a dataset is both complicated and small. Its size limits the number of parameters that can be trained, and prevents learning any complex language modeling simultaneously with the capacity to answer questions. However, there are many use-cases in which comprehension over limited data would be handy (e.g., user manuals, internal documentation, etc.), and work towards more efficient learning from limited data is important in its own right.

In this section details of an exemplary training procedure are described. The training objective is to minimize the ranking loss $$\mathcal{L}(T, q, A) = \max\left(0, \mu + \max_i M_{i\neq *} - M_*\right), \quad (10)$$

where $\mu$ is a constant margin and the maximum taken over i so that ranking the correct answer over the best-ranked incorrect answer (of which there may be multiple). This approach worked better than comparing the correct answer to the incorrect answers individually.

For word vectors, publicly available embeddings may be used and trained, for example, by example using word2vec on a large corpus. These vectors are kept fixed throughout training, since it is found that training them was not helpful (likely because of the size of small data sets). The vectors may be multidimensional, for example, 300-dimensional (d=300) vectors may be used.

In certain aspects, a stopword list may not used for the text passage. Instead these aspects may rely on the trainable word weights to ascribe global importance ratings to words. These weights may be initialized with the inverse document frequency (IDF) statistic computed over an exemplary corpus. However, a short stopword list may be used for questions. This list nullifies query words such as {Who, what, when, where, how}, along with conjugations of the verbs "to do" and "to be."

A heuristic may be used to improve performance on negation questions. When a question contains the words "which" and "not" or "n't," the hypothesis ranking scores may be negated so that the minimum becomes the maximum.

FIGS. 3-6 and the associated descriptions provide a discussion of a variety of operating environments in which aspects of the disclosure may be practiced. However, the devices and systems illustrated and discussed with respect to FIGS. 3-6 are for purposes of example and illustration and are not limiting of a vast number of computing device configurations that may be utilized for practicing aspects of the disclosure, described herein.

Figure 3:
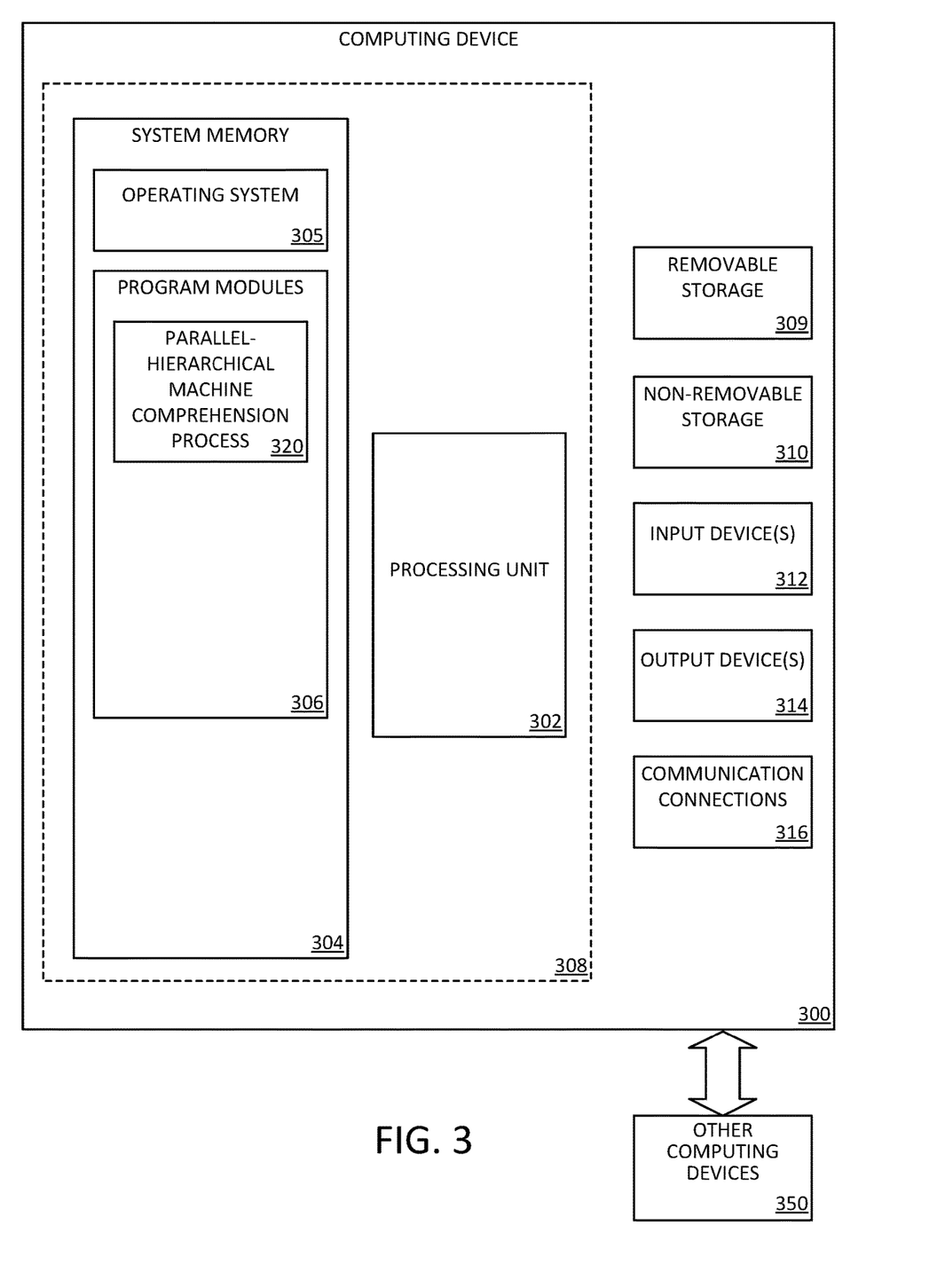
FIG. 3 is a block diagram illustrating example physical components of a computing device with which aspects of the disclosure may be practiced.

FIG. 3 is a block diagram illustrating physical components (e.g., hardware) of a computing device 300 with which aspects of the disclosure may be practiced. The computing device components described below may be suitable for the computing devices described above. In a basic configuration, the computing device 300 may include at least one processing unit 302 and a system memory 304. Depending on the configuration and type of computing device, the system memory 304 may comprise, but is not limited to, volatile storage (e.g., random access memory), non-volatile storage (e.g., read-only memory), flash memory, or any combination of such memories. The system memory 304 may include an operating system 305 and one or more program modules 306 suitable for performing the various aspects disclosed herein such as context association generation component 324 and isolated collection adaptation component 326. The operating system 305, for example, may be suitable for controlling the operation of the computing device 300. Furthermore, embodiments of the disclosure may be practiced in conjunction with a graphics library, other operating systems, or any other application program and is not limited to any particular application or system. This basic configuration is illustrated in FIG. 3 by those components within a dashed line 308. The computing device 300 may have additional features or functionality. For example, the computing device 300 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 304. While executing on the processing unit 302, the program modules 306 (e.g., Parallel-hierarchical machine comprehension process 320) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 300 may also have one or more input device(s) 312 such as a keyboard, a mouse, a pen, a sound or voice input device, a touch or swipe input device, etc. The output device(s) 314 such as a display, speakers, a printer, etc. may also be included. The aforementioned devices are examples and others may be used. The computing device 300 may include one or more communication connections 316 allowing communications with other computing devices 350. Examples of suitable communication connections 316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4A:
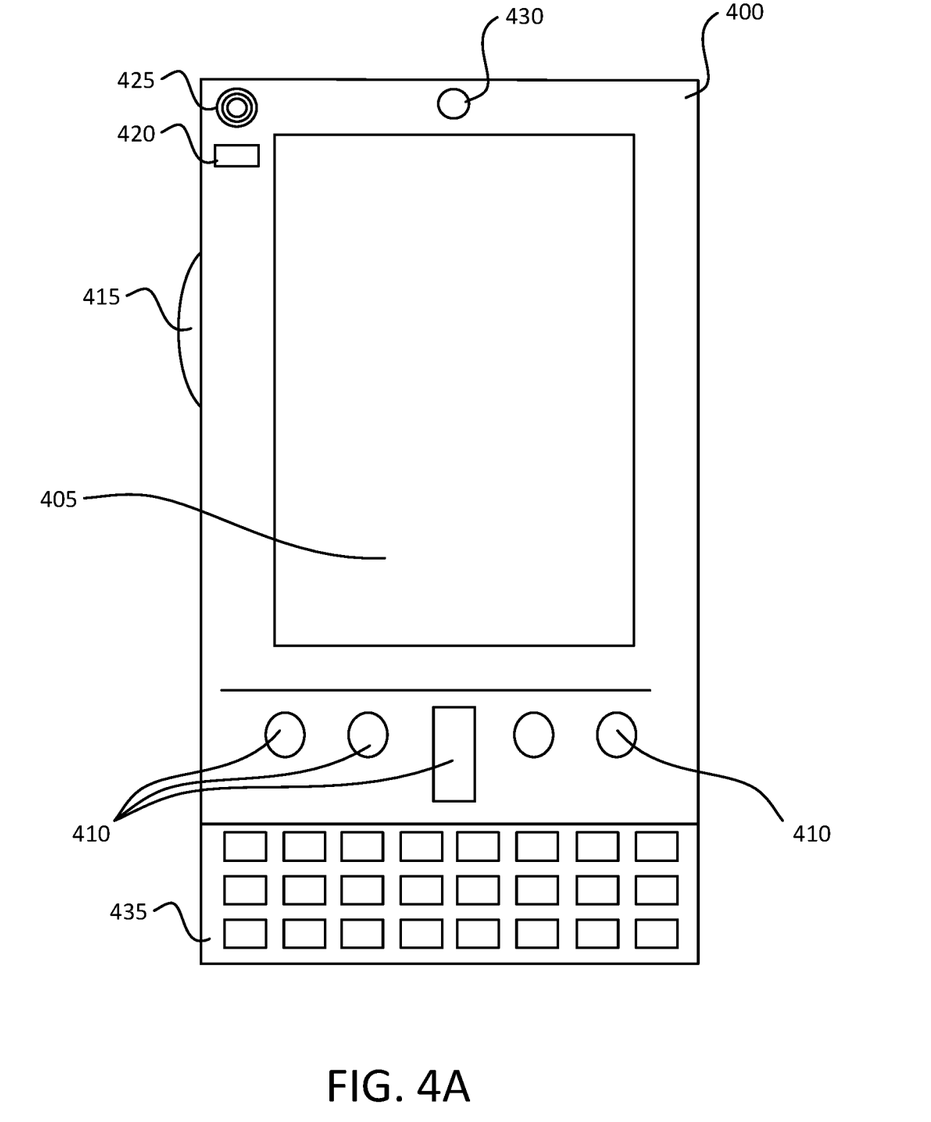
FIGS. 4A and 4B are simplified block diagrams of a mobile computing device with which aspects of the present disclosure may be practiced.
Figure 4B:
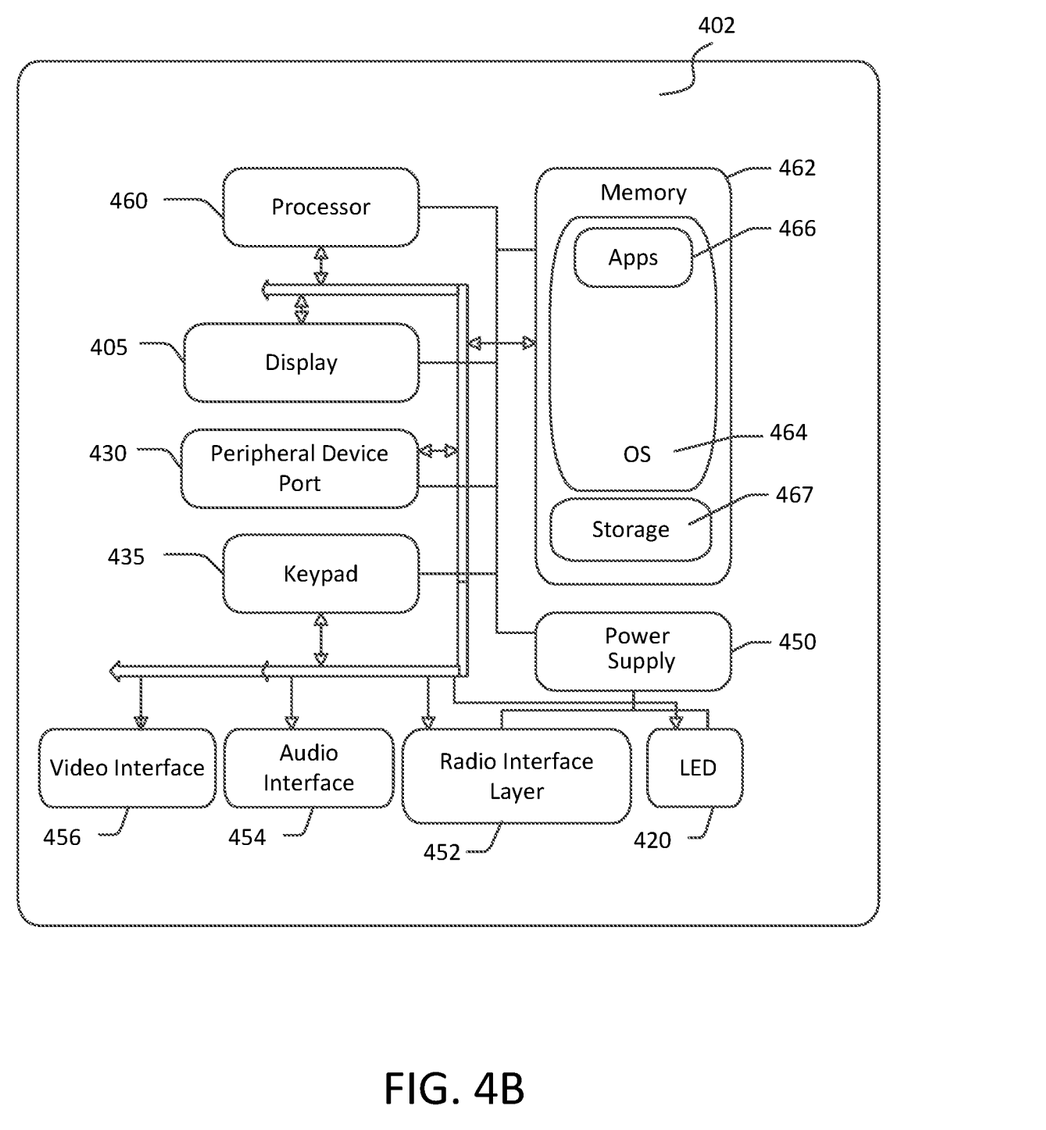

FIGS. 4A and 4B illustrate a mobile computing device 400, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 4A, one aspect of a mobile computing device 400 for implementing the aspects is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., a touch screen display). If included, an optional side input element 415 allows further user input. The side input element 415 may be a rotary switch, a button, or any other type of manual input element. In alternative aspects, mobile computing device 400 may incorporate more or less input elements. For example, the display 405 may not be a touch screen in some embodiments. In yet another alternative embodiment, the mobile computing device 400 is a portable phone system, such as a cellular phone. The mobile computing device 400 may also include an optional keypad 435. Optional keypad 435 may be a physical keypad or a "soft" keypad generated on the touch screen display. In various embodiments, the output elements include the display 405 for showing a graphical user interface (GUI), a visual indicator 420 (e.g., a light emitting diode), and/or an audio transducer 425 (e.g., a speaker). In some aspects, the mobile computing device 400 incorporates a vibration transducer for providing the user with tactile feedback. In yet another aspect, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one aspect of a mobile computing device. That is, the mobile computing device 400 can incorporate a system (e.g., an architecture) 402 to implement some aspects. In one embodiment, the system 402 is implemented as a "smart phone" capable of running one or more applications (e.g., browser, e-mail, calendaring, contact managers, messaging clients, games, and media clients/players). In some aspects, the system 402 is integrated as a computing device, such as an integrated personal digital assistant (PDA) and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400 described herein (e.g., search engine, extractor module, relevancy ranking module, answer scoring module, etc.).

The system 402 has a power supply 470, which may be implemented as one or more batteries. The power supply 470 might further include an external power source, such as an AC adapter or a powered docking cradle that supplements or recharges the batteries.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 466 via the operating system 464, and vice versa.

The visual indicator 420 may be used to provide visual notifications, and/or an audio interface 474 may be used for producing audible notifications via the audio transducer 425. In the illustrated embodiment, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425, the audio interface 474 may also be coupled to a microphone to receive audible input, such as to facilitate a telephone conversation. In accordance with embodiments of the present disclosure, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio interface layer 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio interface layer 472 or via a distributed computing network. Similarly, such data/information may be readily transferred between computing devices for storage and use according to well-known data/information transfer and storage means, including electronic mail and collaborative data/information sharing systems.

Figure 5:
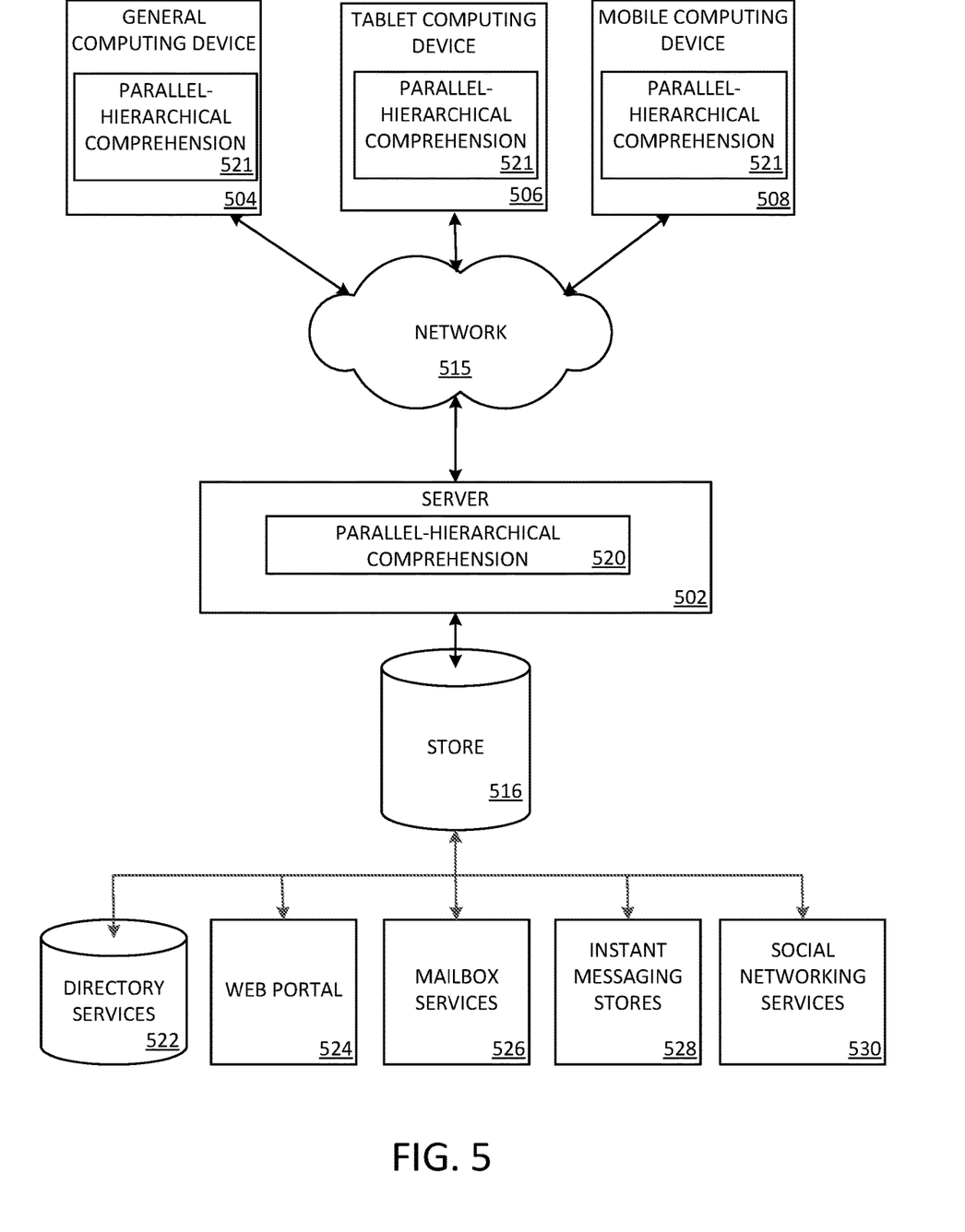
FIG. 5 is a simplified block diagram of a distributed computing system in which aspects of the present disclosure may be practiced.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530. Parallel-hierarchical machine comprehension process 521 may be employed by a client that communicates with server device 502, and/or parallel-hierarchical machine comprehension process 520 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

FIG. 5 illustrates an exemplary tablet computing device 500 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
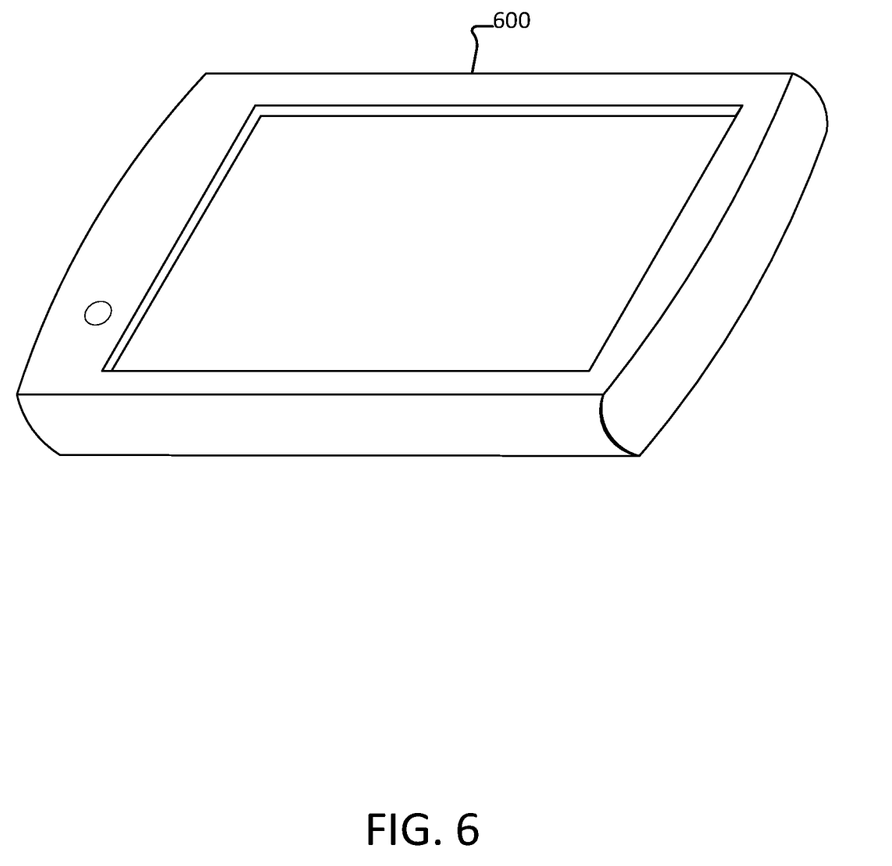
FIG. 6 illustrates a tablet computing device for executing one or more aspects of the present disclosure.

FIG. 6 illustrates an exemplary tablet computing device 600 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The Parallel-Hierarchical aspects disclosed herein does not require complex language or sequence modeling. Nevertheless, the model has proven quite effective for machine comprehension tasks using small data sets, for example the MCTest and other data sets. Although the so-called "multi" questions (putatively) require some limited reasoning, the model is able to handle them reasonably well just by stringing important sentences together. Thus, the model imitates reasoning with a heuristic.

However, it may be that human-level language processing can be factored into separate processes of comprehension and reasoning. If so, the Parallel-Hierarchical model is a good start on the former. Indeed, the method exclusively was trained on single questions then its results become even more impressive: it can achieve a test accuracy of 79.1% on MCTest-500. The Parallel-Hierarchical aspects for machine comprehension disclosed herein, achieves state-of-the-art results, outperforming several feature-based and learning-based approaches. Work on the model has emphasized the following: Language is naturally hierarchical, and good comprehension of language relies on hierarchical levels of understanding; exogenous attention (the trainable word weights) may be broadly helpful for NLP; the training wheels approach, that is, initializing neural networks to perform sensible heuristics, appears helpful for small datasets; and reasoning over language is challenging, but easily simulated in some cases.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, perform a set of operations comprising:
receiving text input;
converting the text input into a distributed representation;
performing parallel-hierarchical machine comprehension on the text input by analyzing the distributed representation of the text input by two or more processes in parallel, wherein a first process of the two or more processes semantically analyzes the input text and a second process of the two or more processes sententially analyzes the input text;
combining results of the two or more processes using a neural network in order to determine a top result; and
providing the top result.

2. The system of claim 1, wherein the text input comprises:
text data;
question data; and
answer data.

3. The system of claim 2, wherein the text input comprises natural language text.

4. The system of claim 3, wherein the first process of the two or more processes comprises a word-by-word process.

5. The system of claim 4, wherein the semantic process compares a hypothesis to sentences in the text data.

6. The system of claim 5, wherein the hypothesis is generated by combining at least a portion of the question data with at least a portion of the answer data.

7. The system of claim 4, wherein the word-by-word process comprises at least one of:
a sliding window sequential process; or
a dependency sliding window dependency process.

8. The system of claim 7, wherein the sliding window sequential process scans over one or more words of the text data as one continuous sequence.

9. The system of claim 7, wherein the sliding window dependency process comprises:
constructing dependency graph for a sentence in the text data;
reordering words in the sentence based at least in part on the dependency graph to generate a reordered sentence; and
scans over one or more words of the reordered sentence.

10. The system of claim 1, wherein the neural network comprises a multilayer perceptron.

11. A method comprising:
receiving text input;
converting the text input into a first distributed representation;
performing parallel-hierarchical machine comprehension on the text input by analyzing the distributed representation of the text input by two or more processes in parallel, wherein a first process of the two or more processes semantically analyzes the input text and a second process of the two or more processes sententially analyzes the input text;
combining results from the two or more processes using a neural network to determine a top result; and
providing the top result.

12. The method of claim 11, wherein the text input comprises:
text data;
question data; and
answer data.

13. The method of claim 12, wherein the semantic process compares a hypothesis to sentences in the text data.

14. The method of claim 13, wherein the hypothesis is generated by combining at least a portion of the question data with at least a portion of the answer data.

15. The method of claim 14, wherein the hypothesis is compared to text data using cosine similarity.

16. The method of claim 11, wherein the first process of the two or more processes comprises the one or more word-by-word process including at least one of:
a sliding window sequential process; or
a dependency sliding window dependency process.

17. The method of claim 16, wherein the sliding window sequential process scans over one or more words of the text data as one continuous sequence.

18. The method of claim 16, wherein the sliding window dependency process comprises:
constructing dependency graph for a sentence in the text data;
reordering words in the sentence based at least in part on the dependency graph to generate a reordered sentence; and
scans over one or more words of the reordered sentence.

19. A computer storage medium comprising computer executable instructions that, when executed by at least one processor, perform operations comprising:
receiving text input;
converting the text input;
converting the text input into a distributed representation;
performing parallel-hierarchical machine comprehension on the text input by analyzing the distributed representation of the text input by two or more processes in parallel, wherein a first process of the two or more processes semantically analyzes the input text and a second process of the two or more processes sententially analyzes the input text and combines results from the two or more processes using a neural network to determine a top result; and
providing the top result.

20. The computer storage medium of claim 19, wherein the text input comprises:
text data;

question data; and
answer data.

* * * * *